(12) United States Patent
Das et al.

(10) Patent No.: US 9,310,251 B2
(45) Date of Patent: *Apr. 12, 2016

(54) AUTOMATED OBJECT CLASSIFICATION USING TEMPERATURE PROFILES

(75) Inventors: Rajarshi Das, Armonk, NY (US);
Canturk Isci, West New York, NJ (US);
Jeffrey O. Kephart, Cortland Manor, NY (US); Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/475,086

(22) Filed: May 18, 2012

(65) Prior Publication Data
US 2013/0311406 A1 Nov. 21, 2013

(51) Int. Cl.
*G01J 5/00* (2006.01)
*G06N 3/08* (2006.01)

(52) U.S. Cl.
CPC ........ *G01J 5/0003* (2013.01); *G01J 2005/0085* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,072,739 B2 * | 7/2006 | Bash et al. | 700/245 |
| 7,072,937 B2 | 7/2006 | Neebe et al. | |
| 7,086,603 B2 * | 8/2006 | Bash et al. | 236/51 |
| 7,091,882 B2 | 8/2006 | Doyle | |
| 7,114,555 B2 * | 10/2006 | Patel et al. | 165/247 |
| 7,218,227 B2 | 5/2007 | Davis et al. | |
| 7,313,461 B2 * | 12/2007 | Sharma et al. | 700/245 |
| 7,366,632 B2 * | 4/2008 | Hamann et al. | 702/130 |
| 7,676,301 B2 * | 3/2010 | Brey et al. | 700/299 |
| 7,792,943 B2 * | 9/2010 | Chainer et al. | 709/223 |
| 7,806,333 B1 | 10/2010 | McReynolds et al. | |
| 7,856,495 B2 * | 12/2010 | Chainer et al. | 709/223 |
| 8,094,020 B2 * | 1/2012 | Groth | G06Q 10/087 340/539.1 |
| 2003/0046339 A1 * | 3/2003 | Ip | H04L 41/12 709/203 |
| 2007/0222597 A1 | 9/2007 | Tourrilhes et al. | |
| 2008/0215284 A1 * | 9/2008 | Hamann et al. | 702/130 |

(Continued)

FOREIGN PATENT DOCUMENTS

CN 101030155 A 9/2007
CN 101482879 A 7/2009

(Continued)

OTHER PUBLICATIONS

Durrant-Whyte, Hugh, and Tim Bailey. "Simultaneous localization and mapping: part I." Robotics & Automation Magazine, IEEE 13.2 (2006): 99-110.*

(Continued)

*Primary Examiner* — Kakali Chaki
*Assistant Examiner* — Daniel Pellett
(74) *Attorney, Agent, or Firm* — Ryan, Mason & Lewis, LLP

(57) ABSTRACT

Methods and apparatus are provided for automated object classification using temperature profiles. An object in an environment (such as an exemplary data center) is classified by obtaining a surface temperature profile of the object; and classifying the object as a particular type of equipment based on the obtained surface temperature profile. The surface temperature profile of the object can be compared to a plurality of predefined characteristic surface temperature profiles each associated with a given type of equipment.

22 Claims, 3 Drawing Sheets

(56) References Cited

U.S. PATENT DOCUMENTS

| | | | | |
|---|---|---|---|---|
| 2008/0272887 | A1* | 11/2008 | Brey | H04L 12/24 340/10.1 |
| 2009/0017816 | A1* | 1/2009 | Chainer et al. | 455/425 |
| 2009/0326879 | A1* | 12/2009 | Hamann et al. | 703/2 |
| 2010/0230597 | A1* | 9/2010 | Kumhyr et al. | 250/340 |
| 2011/0040532 | A1* | 2/2011 | Hamann et al. | 703/2 |
| 2011/0218730 | A1* | 9/2011 | Rider et al. | 701/201 |
| 2013/0231779 | A1* | 9/2013 | Purkayastha | B25J 9/1697 700/259 |

FOREIGN PATENT DOCUMENTS

| | | |
|---|---|---|
| JP | 2005134276 A | 5/2005 |
| WO | WO2008130022 A1 | 10/2008 |

OTHER PUBLICATIONS

Castelli, Franco. "An integrated tactile-thermal robot sensor with capacitive tactile array." Industry Applications, IEEE Transactions on 38.1 (2002): 85-90.*

Chan, Hoi, et al. "A robot as mobile sensor and agent in data center energy management." Proceedings of the 8th ACM international conference on Autonomic computing. ACM, 2011.*

Hamann, Hendrik F., et al. "Rapid three-dimensional thermal characterization of large-scale computing facilities." Components and Packaging Technologies, IEEE Transactions on 31.2 (2008): 444-448.*

Lenchner, Jonathan, et al. "Towards data center self-diagnosis using a mobile robot." Proceedings of the 8th ACM international conference on Autonomic computing. ACM, 2011.*

Mansley, Chris, et al. "Robotic mapping and monitoring of data centers." Robotics and Automation (ICRA), 2011 IEEE International Conference on. IEEE, 2011.*

Meisinger, A. "Explosion protection in electrical installations: European standards." La Technique Moderne 79.9-10 (1987): 37-40.*

Kant, K.—et al.; "Enabling location-based services in data centers"; IEEE Network; vol. 22; No. 6; pp. 20-25; Nov.-Dec. 2008.

Kant, K.; "Emerging Challenges in Distributed Virtualized Data Centers"; www.kkant.net/presentations/ICCCN_2010_talk . . . ; Mar. 2010.

Xerafy; "Simplifying IT Management and Data Security with RFID"; ww.xerafy.com/sites/defaults/files/...files/xerafy_it_asset_management.pdf; Jul. 2011.

* cited by examiner

AUTOMATED OBJECT CLASSIFICATION USING TEMPERATURE PROFILES

FIELD OF THE INVENTION

The present invention relates to automated techniques for automatically classifying objects, such as equipment in a data center or another environment.

BACKGROUND OF THE INVENTION

Data centers house information technology (IT) equipment and other objects, such as servers, telecommunication systems and storage systems. This IT equipment is normally housed in racks. Data centers also contain secondary equipment to keep the IT equipment functioning, and, moreover, functioning under acceptable environmental conditions, such as acceptable ranges of heat and humidity. This secondary equipment is often referred to as "facilities equipment" and includes power distribution units (PDUs), computer room air conditioners (CRACs) and uninterruptable power supplies. It is often challenging to locate and classify the equipment in a large computing facility or data center.

When a computer data center is built or goes into service, there is often an accompanying layout document or blueprint that identifies the location and type of each piece of equipment in the center. This document is often created using a Computer Aided Design (CAD) tool or similar software. The layout shows the initial location of equipment at the time the data center was established and is typically updated only after a major redesign of the center. Such drawings are rarely updated as equipment is replaced and any of a myriad of minor layout changes are made to the center. Maintaining such a document is cumbersome and is therefore often neglected.

A number of techniques have been proposed or suggested for employing one or more robots to automatically navigate, map and monitor data centers. For example, J. Lenchner et al., "Towards Data Center Self-Diagnosis Using a Mobile Robot," ACM Int'l Conf. on Autonomic Computing (ICAC '11) (2011), incorporated by reference herein, discloses a robot that serves as a physical autonomic element to automatically navigate, map and monitor data centers. The disclosed robot navigates a data center, mapping its layout, and monitoring its temperature and other quantities of interest with little, if any, human assistance. In addition, U.S. patent application Ser. No. 12/892,532, filed Sep. 28, 2010, entitled "Detecting Energy and Environmental Leaks in Indoor Environments Using a Mobile Robot," incorporated by reference herein, discloses techniques for energy and environmental leak detection in an indoor environment using one or more mobile robots.

While the use of robots has greatly improved the ability to automatically monitor indoor environments, they suffer from a number of limitations, which if overcome, could further extend the utility and efficiency of robots that are monitoring an indoor environment. For example, the robots are unable to automatically classify the type of data center equipment.

A number of tagging techniques have been proposed or suggested to automatically classify the location and/or type of data center equipment. For example, barcodes and RFID tags have been used to allow equipment to be automatically identified. Barcodes and RFID tags, however, require that the equipment be previously tagged with a barcode and/or an RFID tag—a process that is labor intensive and hence expensive.

A need remains for automated techniques for identifying, locating and/or classifying objects, such as equipment in a data center or another environment. Yet another need remains for automated techniques for identifying, locating and/or classifying objects without having to tag the equipment in some way.

SUMMARY OF THE INVENTION

Generally, methods and apparatus are provided for automated object classification using temperature profiles. According to one aspect of the invention, an object in an environment (such as an exemplary data center) is classified by obtaining a surface temperature profile of the object; and classifying the object as a particular type of equipment based on the obtained surface temperature profile. The surface temperature profile of the object can be compared to a plurality of predefined characteristic surface temperature profiles each associated with a given type of equipment.

The predefined characteristic surface temperature profiles can be stored, for example, as rules and/or feature vectors. The predefined characteristic surface temperature profiles associated with a given type of equipment can optionally be learned over time using human-labeled examples.

The predefined characteristic surface temperature profiles evaluate temperature characteristics of the object, such as a bottom-to-top temperature gradient of the object, a temperature of the object at one or more air inlets and a temperature of the object at one or more air outlets. The predefined characteristic surface temperature profiles can optionally compare a surface temperature of the object to an air temperature. In a further variation, the predefined characteristic surface temperature profiles can evaluate an approximate height populated with equipment that is powered on. A further classification criterion can be based on a physical extent of the object.

The surface temperature profile of the object can be obtained, for example, using a robot having at least one temperature measuring device, and/or a plurality of infrared imaging devices. The robot optionally further comprises a location sensing capability.

A more complete understanding of the present invention, as well as further features and advantages of the present invention, will be obtained by reference to the following detailed description and drawings.

DETAILED DESCRIPTION OF PREFERRED EMBODIMENTS

Figure 1:
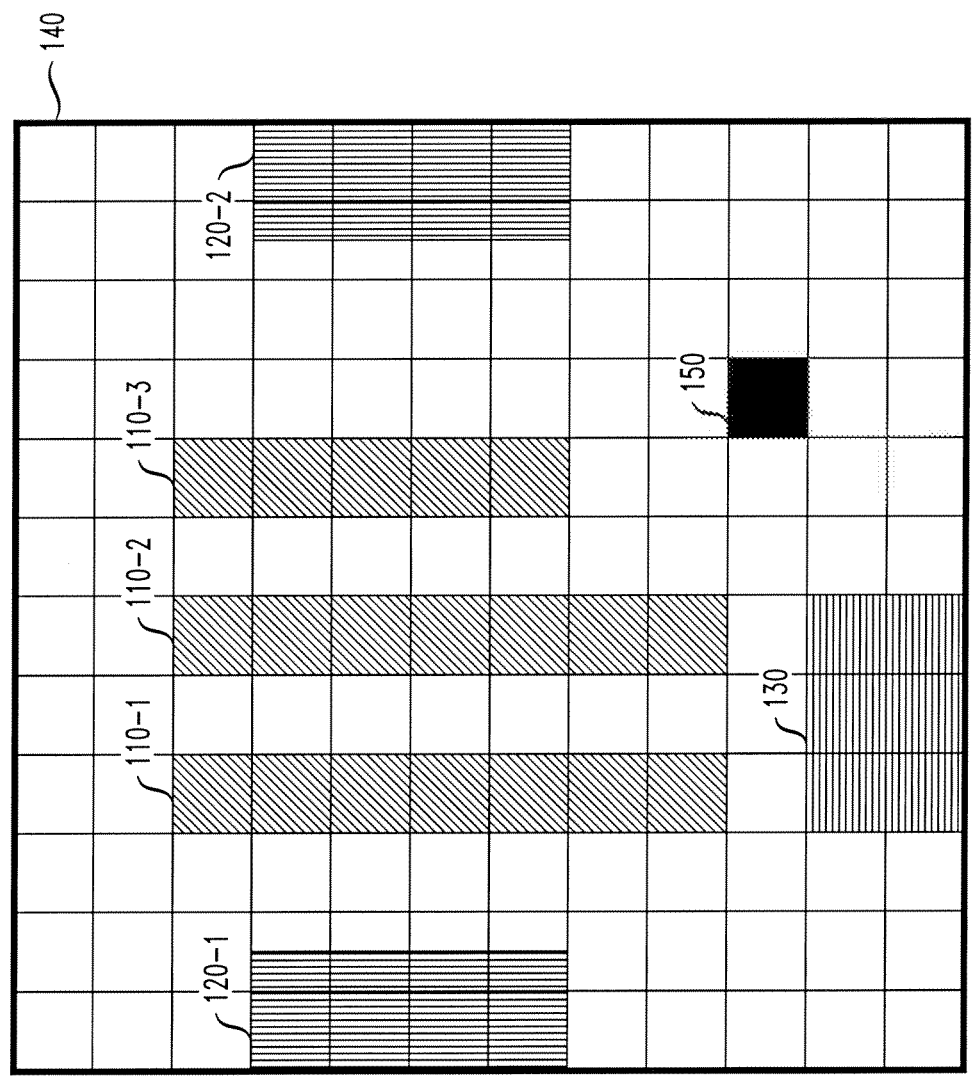
FIG. 1 illustrates an exemplary indoor environment (e.g., a data center) in which the present invention can be employed.

The present invention provides automated techniques for identifying, locating and/or classifying objects, such as equipment in a data center or another environment. For example, data centers house information technology (IT) equipment housed in racks in addition to secondary "facilities equipment" to keep the IT equipment functioning, and, moreover, functioning under acceptable environmental conditions.

The present invention recognizes that many of these types of objects have distinguishing surface temperature profiles. The surface temperature profile is evident upon inspection with a thermal measuring device, such as an infrared thermometer or an infrared camera. According to one aspect of the invention, a data center monitoring robot is outfitted with an infrared sensing capability for classifying the object type (e.g., equipment type) and location sensing capability for determining the location of the object. In this manner, the data center monitoring robot can classify such object and also determine the position of the classified equipment. In one variation, a configuration of deployed infrared cameras can be employed to classify and locate objects in a data center or another environment.

The present invention recognizes, for example, that a Computer Room Air Conditioning unit is similar to a refrigerator and is cold to the touch. Although a CRAC has a detectable bottom-to-top temperature gradient (increasing temperature with height), a CRAC is uniformly cold at its bottom (in other words, cold along all of its bottom sides), as opposed to a rack of servers or other IT equipment, which is typically cold only at the air inlet sides, especially if the IT equipment is situated (as is typical) with its inlet side facing perforated tiles, through which cool air is vented.

Power Distribution Units (or PDUs) may be warm to the touch but PDUs are often well insulated and do not have a noticeably different surface temperature than walls. PDUs, however, can be distinguished from room walls in that they are three dimensional (having a substantial thickness or depth) and do not form the boundary of a room. If interior to a room, PDUs are not as thin, narrow and long as walls. PDUs can be distinguished from pillars or columns in that they generally do not extend to the ceiling and are typically more than a couple of feet wide.

According to a further aspect of the invention, the approximate height to which racks are populated with equipment or other objects (with the power turned on) can be identified, since temperatures inside the racks on both the intake and exhaust sides of the racks will generally plateau at such points. A temperature plateau develops because a relatively motionless air mass tends to accumulate inside of the racks at and above such elevations, with no air being actively drawn into the inlet side and no air being expelled from the outlet side.

As discussed hereinafter, in an exemplary implementation, a robot can determine its location within an environment, for example, using a computer vision system, or another Simultaneous Localization and Mapping (SLAM) system, such as one based on laser range finding. In addition, in accordance with the present invention, the robot can be deployed with an infrared sensor that is directed at all obstacles to obtain an infrared profile, such as a top-to-bottom infrared profile.

As discussed hereinafter, each time a robot encounters an object, the surface temperature profile of the detected object is evaluated to determine if the object can be classified as a particular type of equipment based on its surface temperature profile. In one variation, if the object cannot be classified as a particular type of equipment based on its surface temperature profile, then the object is optionally further evaluated using a vision or laser system to determine the physical extent of the object to differentiate between certain types of equipment and walls or other obstacles.

The characteristic surface temperature profiles can be recorded, for example, in the form of one or more rules within a rule base or a process or in one or more feature vectors. The characteristic surface temperature profiles may be manually created/entered by a human, or automatically learned by a learning system using human-labeled examples. For example, pictures of assets from a data center can be presented to a human for classification. Thereafter, the learning system can, for example, form clusters of associated temperatures and front-to-back/bottom-to-top temperature gradients based on the human-assigned asset type. When a new, unknown asset is encountered, the system can then find the closest matching cluster and assign the asset type based on the associated cluster.

The term "building," as used herein, is intended to refer to a variety of facilities, including, but not limited to, data centers, manufacturing facilities, industrial office space, and residential buildings.

As previously indicated, in one exemplary implementation, a robot is outfitted with an infrared sensing capability for classifying the type of equipment and location sensing capability for determining the location of the equipment. For a detailed discussion of suitable exemplary robots, see, for example, U.S. patent application Ser. No. 12/892,532, filed Sep. 28, 2010, entitled "Detecting Energy and Environmental Leaks in Indoor Environments Using a Mobile Robot," and/or U.S. patent application Ser. No. 13/348,846, filed Jan. 12, 2012, entitled "Discovery and Monitoring of an Environment Using a Plurality of Robots," each incorporated by reference herein.

The term "robot," as used herein, refers generally to any form of mobile electro-mechanical device that can be controlled by electronic or computer programming. In this basic form, as will be described in detail below, the exemplary robots move throughout the designated portions of the building 100 and take temperature, air flow and/or airborne matter measurements as well as time and positioning data (so as to permit the temperature, air flow and/or airborne matter data to be associated with a given position in the building 100 at a particular time). The robots should be capable of moving in various directions along the floor of the building, so as to navigate where the robots need to go and to maneuver around obstacles, such as equipment, furniture, walls, etc. in the building 100.

In one variation of the invention, a configuration of deployed infrared cameras can be employed to classify and locate equipment in a data center or another environment, without the use of robots.

FIG. 1 illustrates an exemplary indoor environment 100, such as a data center, in which the present invention can be employed. While the present invention is illustrated in the context of an exemplary data center, the present invention can be employed in any environment having equipment with significantly varying surface temperature profiles, such as a manufacturing environment where the manufacturing equipment has characteristic surface temperature profiles, as would be apparent to a person of ordinary skill in the art.

The exemplary indoor environment 100 of FIG. 1 comprises an exemplary array of 12-by-12 tiles. The exemplary data center comprises three racks 110-1 through 110-3 of information technology equipment, two computer room air conditioners (CRACs) 120-1 and 120-2, a power distribution unit (PDU) 130, walls 140, comprising the outer boundary of the center, and a single pillar 150.

Figure 2:
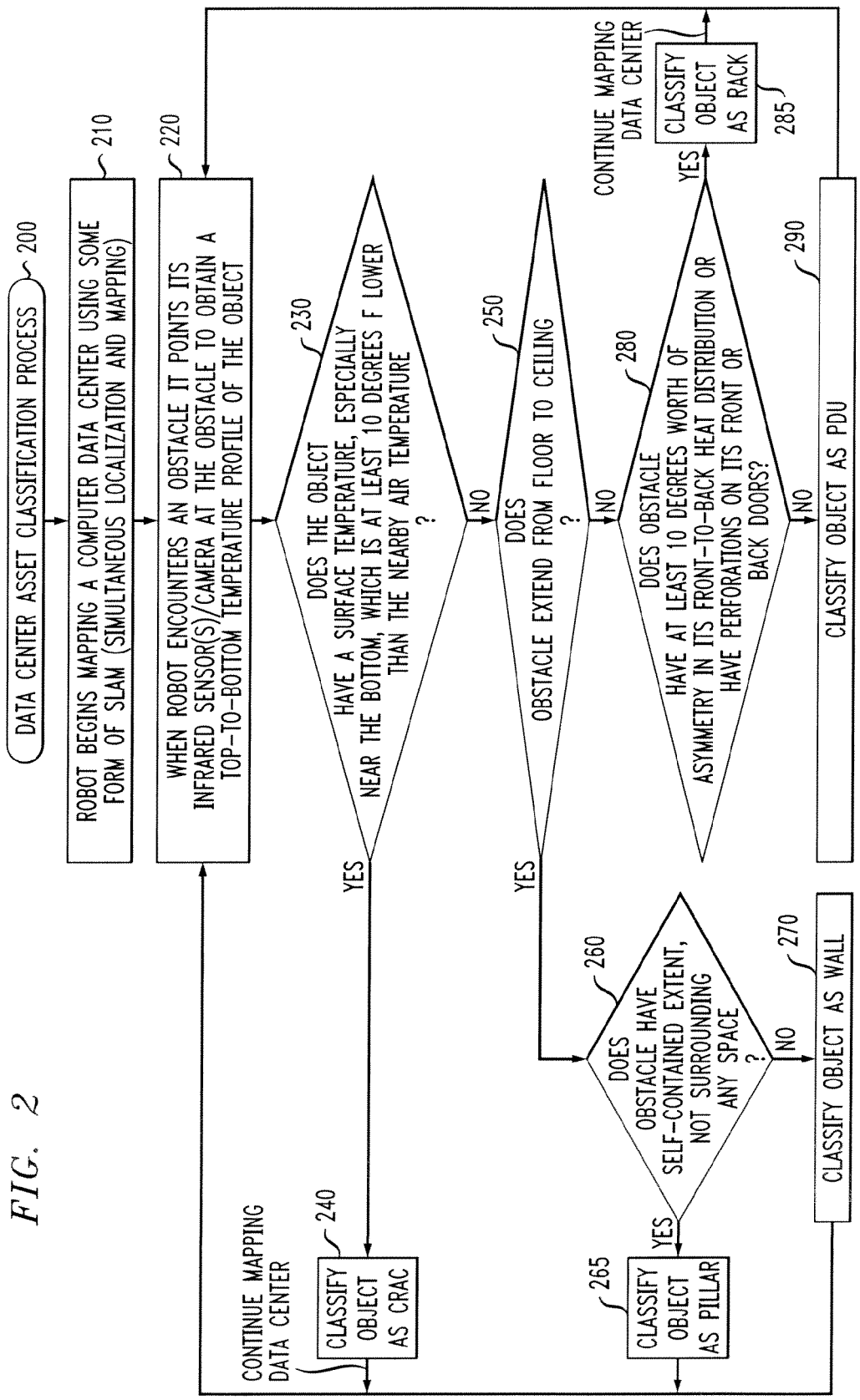
FIG. 2 is a flow chart describing an exemplary implementation of an exemplary data center asset classification process.

FIG. 2 is a flow chart describing an exemplary implementation of an exemplary data center asset classification process 200 incorporating aspects of the present invention. As shown in FIG. 2, during step 210 of the exemplary data center asset classification process 200, a robot begins mapping a computer data center using some form of SLAM (Simultaneous Localization and Mapping).

When the robot encounters an obstacle during step 220, the robot points its infrared sensor(s) or camera at the obstacle to obtain a top-to-bottom temperature profile of the detected object. A test is performed during step 230 to determine if the object has a surface temperature, especially near the bottom, that is at least 10 degrees Fahrenheit (F) lower than the nearby air temperature. If it is determined during step 230 that the object has a surface temperature that is at least 10 degrees F. lower than the nearby air temperature, then the object is classified as a CRAC during step 240. Thereafter, the exemplary data center asset classification process 200 returns to step 220 to continue mapping other portions of the environment 100.

If, however, it is determined during step 230 that the object does not have a surface temperature that is at least 10 degrees F. lower than the nearby air temperature, then a further test is performed during step 250 to determine if the obstacle extends from floor to ceiling. If it is determined during step 250 that the object extends from floor to ceiling, then a further test is performed during step 260 to determine if the obstacle has a self-contained extent, not surrounding any space (i.e., in the sense that the wall 140 around a room surrounds space).

If it is determined during step 260 that the object has a self-contained extent, not surrounding any space, then the object is classified during step 265 as a pillar. Thereafter, the exemplary data center asset classification process 200 returns to step 220 to continue mapping other portions of the environment 100.

If, however, it is determined during step 260 that the object does not have a self-contained extent, then the object is classified during step 270 as a wall. Thereafter, the exemplary data center asset classification process 200 returns to step 220 to continue mapping other portions of the environment 100.

If it was determined during step 250 that the object does not extend from floor to ceiling, then a further test is performed during step 280 to determine if the obstacle has at least 10 degrees F. of asymmetry in its front-to-back heat distribution or have perforations on its front or back doors. If it is determined during step 280 that the object has at least 10 degrees F. of asymmetry in its front-to-back heat distribution or has perforations on its front or back doors, then the object is classified during step 285 as a rack. Thereafter, the exemplary data center asset classification process 200 returns to step 220 to continue mapping other portions of the environment 100.

If, however, it is determined during step 280 that the object does not have at least 10 degrees F. of asymmetry in its front-to-back heat distribution or perforations on its front or back doors, then the object is classified during step 290 as a PDU. Thereafter, the exemplary data center asset classification process 200 returns to step 220 to continue mapping other portions of the environment 100.

According to an exemplary embodiment, each robot also has a vision component, e.g., a mounted camera. In the context of a regularly gridded (e.g., tiled) room such as a data center, the vision component of the robot is responsible for detecting a "pose" of the robot with respect to the center of a tile, and for determining whether the next tile which the robot wishes to investigate is visitable or blocked (for example, because the tile is occupied by equipment or otherwise obstructed). The pose of the robot is the location and orientation of the robot relative to the forward pointing "orthogonal" orientation at the center of the tile. The forward pointing orthogonal orientation is the orientation that is exactly aligned with the intended reckoning of the robot (from the center of one tile to the center of a second adjacent tile), such that if the robot moved straight ahead it would cross the boundary between the tiles along a path which is perpendicular (orthogonal) to the tile boundary, and reach the center of the second tile in which it either intends to get to or intends to inspect, with the purpose of determining whether the second tile is visitable. This assumes that a (theoretical) straight line connecting the centers of two adjacent tiles is perpendicular (orthogonal) to the boundary between the two tiles, which is typically the case in data centers and many other indoor environments.

In the data center context, the vision component specializes in detecting tile boundaries, determining a distance of the robot from a tile boundary (and thereby, a distance of the robot from the center of the tile), determining an angle the robot currently makes with the line orthogonal to the next tile boundary, and determining whether the next tile in the direction the robot is headed is occupied or visitable. According to an exemplary embodiment, the robot automatically determines, e.g., tile boundaries and whether a tile is visitable or obstructed. The programming of the robot to perform this task would be apparent to one of skill in the art and thus is not described further herein. For orientation purposes, the robot has a forward-pointing direction determined by the direction in which the vision component, e.g., camera, faces. This forward-pointing direction is also aligned with a forward wheel direction when the robot is instructed to move forward (i.e., when the robot rotates, it is not just the wheels that rotate but the entire assembly).

In a more general facility where there is no guarantee of a gridded layout of tiles, the robot can use methods of simultaneous localization and mapping (SLAM) not based entirely on vision, but in addition, or instead, based on laser range finding, sonar, detecting reflected patterned infrared light, or other methods.

While FIG. 2 shows an exemplary sequence of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore. aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
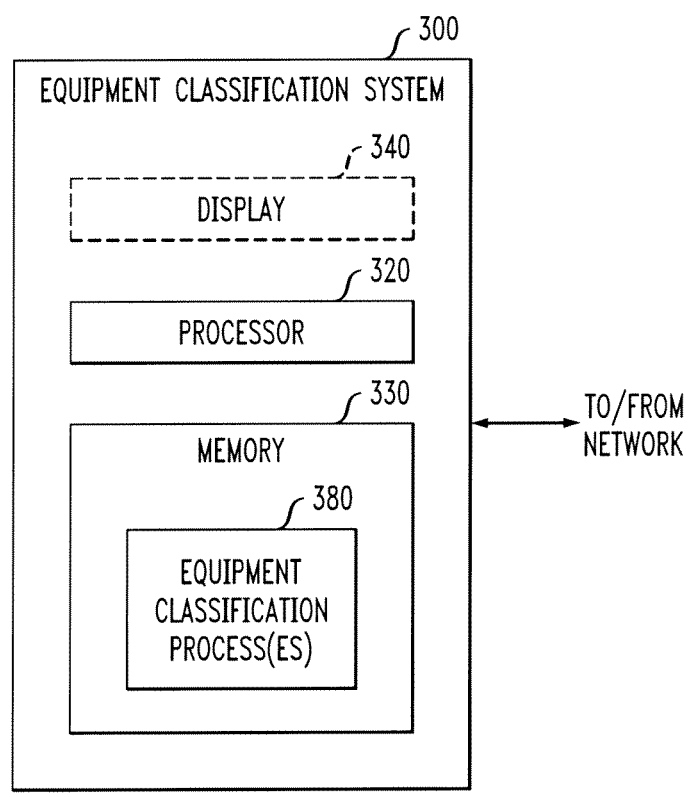
FIG. 3 is a block diagram of a robot navigation system that can implement the processes of the present invention.

FIG. 3 is a block diagram of an equipment classification system 300 that can implement the processes of the present invention. As shown in FIG. 3. memory 330 configures the processor 320 to implement the robot navigation and equipment classification methods, steps, and functions disclosed herein (collectively, shown as 380 in FIG. 3). The memory 330 could be distributed or local and the processor 320 could be distributed or singular. The memory 330 could be implemented as an electrical, magnetic or optical memory, or any combination of these or other types of storage devices. It should be noted that each distributed processor that makes up processor 320 generally contains its own addressable memory space. It should also be noted that some or all of computer system 300 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. An apparatus for classifying an object in an environment, the apparatus comprising:
    a memory; and
    at least one hardware device, coupled to the memory, operative to:
    obtain a surface temperature profile for a plurality of surface points of said object in an operational mode;
    evaluate a physical extent of said object;
    classify said object as a part of a structure of said environment if said object extends from a floor to a ceiling in said environment; and
    if said object does not extend from said floor to said ceiling in said environment, classify said object as a particular type of one or more of information technology equipment and facilities equipment based on said obtained surface temperature profile for said plurality of surface points of said object in an operational mode and said physical extent.

2. The apparatus of claim 1, wherein said at least one hardware device is further configured to compare said surface temperature profile of said object to a plurality of predefined characteristic surface temperature profiles each associated with a given type of equipment.

3. The apparatus of claim 2, wherein said predefined characteristic surface temperature profiles are stored as one or more of rules and feature vectors.

4. The apparatus of claim 2, wherein said predefined characteristic surface temperature profiles evaluate temperature characteristics of said object.

5. The apparatus of claim 4, wherein said temperature characteristics of said object comprise a temperature of said object at one or more air inlets.

6. The apparatus of claim 1, wherein said at least one hardware device is further configured to determine a location of said object.

7. The apparatus of claim 1, wherein said environment comprises a manufacturing environment.

8. The apparatus of claim 2, wherein said plurality of predefined characteristic surface temperature profiles associated with a given type of equipment is learned over time using human-labeled examples.

9. An article of manufacture for classifying an object in an environment, comprising a non-transitory machine readable recordable medium containing one or more programs which when executed implement the steps of:
obtaining a surface temperature profile for a plurality of surface points of said object in an operational mode;
evaluating a physical extent of said object;
classifying said object as a part of a structure of said environment if said object extends from a floor to a ceiling in said environment; and
if said object does not extend from said floor to said ceiling in said environment, classifying said object as a particular type of one or more of information technology equipment and facilities equipment based on said obtained surface temperature profile for said plurality of surface points of said object in an operational mode and said physical extent.

10. The article of manufacture of claim 9, further comprising the step of comparing said surface temperature profile of said object to a plurality of predefined characteristic surface temperature profiles each associated with a given type of equipment.

11. The article of manufacture of claim 10, wherein said predefined characteristic surface temperature profiles are stored as one or more of rules and feature vectors.

12. The article of manufacture of claim 10, wherein said predefined characteristic surface temperature profiles evaluate temperature characteristics of said object.

13. The article of manufacture of claim 12, wherein said temperature characteristics of said object comprise a temperature of said object at one or more air inlets.

14. article of manufacture of claim 10, wherein said predefined characteristic surface temperature profiles compare a surface temperature of said object to an air temperature.

15. The article of manufacture of claim 10, wherein said predefined characteristic surface temperature profiles evaluate an approximate height populated with equipment that is powered on.

16. The article of manufacture of claim 9, further comprising the step of determining a location of said object.

17. The article of manufacture of claim 16, wherein said location of said object is determined using a Simultaneous Localization and Mapping system.

18. The article of manufacture of claim 9, wherein said surface temperature profile of said object is obtained using a robot having at least one temperature measuring device.

19. The article of manufacture of claim 18, wherein said robot further comprises a location sensing capability.

20. The article of manufacture of claim 9, wherein said surface temperature profile of said object is obtained using a plurality of infrared imaging devices.

21. The article of manufacture of claim 9, wherein said environment comprises a manufacturing environment.

22. The article of manufacture of claim 10, wherein said plurality of predefined characteristic surface temperature profiles associated with a given type of equipment is learned over time using human-labeled examples.

\* \* \* \* \*